United States Patent
Jones et al.

(10) Patent No.: US 7,650,681 B2
(45) Date of Patent: Jan. 26, 2010

(54) BLIND RIVET METHOD

(75) Inventors: Steven V. Jones, Birmingham (GB); Stephen Morris, Sutton Coldfield (GB); James Hughes, Birmingham (GB)

(73) Assignee: Newfrey LLC, Newark, DE (US)

( * ) Notice: Subject to any disclaimer, the term of this patent is extended or adjusted under 35 U.S.C. 154(b) by 540 days.

(21) Appl. No.: 11/652,962

(22) Filed: Jan. 12, 2007

(65) Prior Publication Data

US 2007/0110540 A1    May 17, 2007

Related U.S. Application Data

(62) Division of application No. 10/430,742, filed on May 6, 2003.

(30) Foreign Application Priority Data

May 8, 2002    (GB) ................................. 0210463.6

(51) Int. Cl.
*B21D 39/00* (2006.01)
*F16B 13/04* (2006.01)
(52) U.S. Cl. ....................................... 29/524.1; 411/42
(58) Field of Classification Search ................. 29/524.1, 29/525, 525.03, 525.05, 525.06, 523, 512, 29/243.54; 72/391.4; 411/501, 42; 403/274
See application file for complete search history.

(56) References Cited

U.S. PATENT DOCUMENTS

| | | | |
|---|---|---|---|
| 1,979,686 A | 11/1934 | Hall et al. | |
| 1,996,128 A | 4/1935 | Morris | |
| 2,146,461 A | 2/1939 | Bettington | |
| 2,183,543 A | 12/1939 | Cherry | |
| 2,328,023 A | 8/1943 | Lang | |
| 2,366,965 A | 1/1945 | Johnson | |
| 2,371,423 A | 3/1945 | Buchet | |
| 2,371,452 A | 3/1945 | Lees, Jr. | |
| 2,384,321 A | 9/1945 | Lees, Jr. | |

(Continued)

FOREIGN PATENT DOCUMENTS

DE    3612501    10/1987

(Continued)

OTHER PUBLICATIONS

Mark P. Spector: "AE Blind Riveting of Plastics", 'Design/Fastening/Joining', believed to have been published before 2002, 4 pages.

(Continued)

*Primary Examiner*—John C Hong
(74) *Attorney, Agent, or Firm*—Harness, Dickey & Pierce, P.L.C.

(57) ABSTRACT

There is provided a blind rivet including an axially extending hollow tubular body having a tail end face at one end and a pre-formed radially enlarged flange at the other end, together with a mandrel having a stem which extends co-axially though the body and having enlarged head adjacent the tail end of the body, the stem having a weakened region immediately adjacent the head. There is also provided a method of fastening at least two workpieces using such a blind rivet, including providing the blind side of the workpieces with a countersunk region to accommodate the conically deformed tail end of the body after setting, substantially flush therewith.

29 Claims, 1 Drawing Sheet

U.S. PATENT DOCUMENTS

| | | |
|---|---|---|
| 2,546,602 A | 3/1951 | Keating |
| 2,774,098 A | 12/1956 | Tieri |
| 2,885,798 A | 5/1959 | Wilson et al. |
| 3,047,181 A | 7/1962 | Heidenwolf |
| 3,055,255 A | 9/1962 | Burrell |
| 3,144,158 A | 8/1964 | Nouvelet |
| 3,148,578 A | 9/1964 | Gapp |
| 3,390,601 A | 7/1968 | Summerlin |
| 3,424,051 A | 1/1969 | Baugh |
| 3,438,301 A | 4/1969 | Mattioli |
| 3,459,447 A | 8/1969 | Hurd et al. |
| 3,460,429 A | 8/1969 | La Torre |
| 3,491,649 A | 1/1970 | Smouton et al. |
| 3,750,518 A | 8/1973 | Rayburn |
| 3,835,688 A | 9/1974 | King, Jr. |
| 3,837,208 A | 9/1974 | Davis et al. |
| 3,915,055 A | 10/1975 | Binns |
| 3,922,586 A | 11/1975 | Buxton et al. |
| 3,949,535 A | 4/1976 | King, Jr. |
| 3,975,786 A | 8/1976 | Gapp et al. |
| 4,003,288 A | 1/1977 | Jeal |
| 4,044,591 A | 8/1977 | Powderley |
| 4,137,817 A | 2/1979 | Siebol |
| 4,164,807 A | 8/1979 | King, Jr. |
| 4,236,429 A | 12/1980 | Dolch |
| 4,261,245 A | 4/1981 | Mauer |
| 4,388,031 A | 6/1983 | Rodgers |
| 4,407,619 A | 10/1983 | Siebol |
| 4,447,944 A | 5/1984 | Mohrman |
| 4,466,048 A | 8/1984 | Schwab |
| 4,473,914 A | 10/1984 | Haft |
| 4,497,603 A | 2/1985 | Boucher et al. |
| 4,507,706 A | 3/1985 | Trexler, Jr. |
| 4,541,032 A | 9/1985 | Schwab |
| 4,541,761 A | 9/1985 | Bryce, Jr. |
| 4,585,382 A | 4/1986 | Bryce, Jr. |
| 4,620,825 A | 11/1986 | Potzas |
| 4,659,271 A | 4/1987 | Pratt et al. |
| 4,702,655 A | 10/1987 | Kendall |
| 4,736,560 A | 4/1988 | Murphy |
| 4,765,010 A | 8/1988 | Jeal et al. |
| 4,781,501 A | 11/1988 | Jeal et al. |
| 4,836,728 A | 6/1989 | Mauer et al. |
| 4,858,067 A | 8/1989 | Rochelle et al. |
| 4,863,325 A | 9/1989 | Smith |
| 4,893,390 A | 1/1990 | Hoeffken |
| 4,897,003 A | 1/1990 | Bradley et al. |
| 4,904,133 A | 2/1990 | Wright |
| 4,909,687 A | 3/1990 | Bradley et al. |
| 4,929,137 A | 5/1990 | Bossenmaier |
| 4,958,971 A | 9/1990 | Lacey et al. |
| 4,969,785 A | 11/1990 | Wright |
| 5,006,024 A | 4/1991 | Siebol |
| 5,035,129 A | 7/1991 | Denham et al. |
| 5,044,850 A | 9/1991 | Getten et al. |
| 5,054,977 A | 10/1991 | Schultz |
| 5,167,585 A | 12/1992 | Williams |
| 5,252,013 A | 10/1993 | Browne et al. |
| 5,259,713 A | 11/1993 | Renner et al. |
| 5,299,667 A | 4/1994 | Hammond |
| 5,320,465 A | 6/1994 | Smith |
| 5,333,980 A | 8/1994 | Pratt et al. |
| 5,359,765 A | 11/1994 | Auriol et al. |
| 5,378,098 A | 1/1995 | Andrews et al. |
| 5,403,135 A | 4/1995 | Renner et al. |
| 5,443,344 A | 8/1995 | Underwood, Jr. |
| 5,476,350 A | 12/1995 | Kurtz et al. |
| 5,496,140 A | 3/1996 | Gossmann et al. |
| 5,503,510 A | 4/1996 | Golan |
| 5,551,817 A | 9/1996 | Kanie |
| 5,569,006 A | 10/1996 | Alvarado et al. |
| 5,645,383 A | 7/1997 | Williams |
| 5,651,172 A | 7/1997 | Auriol et al. |
| 5,658,107 A | 8/1997 | Smith |
| 5,689,873 A | 11/1997 | Luhm |
| 5,741,099 A | 4/1998 | Aasgaard |
| 5,743,691 A | 4/1998 | Donovan |
| 5,759,001 A | 6/1998 | Smith |
| 5,881,989 A | 3/1999 | O'Brien et al. |
| 5,889,648 A | 3/1999 | Heavirland et al. |
| 5,890,693 A | 4/1999 | Do et al. |
| 5,915,901 A | 6/1999 | Aasgaard |
| 5,960,667 A | 10/1999 | Hylwa et al. |
| 5,982,610 A | 11/1999 | Crawford et al. |
| 6,004,086 A | 12/1999 | Gand et al. |
| 6,007,287 A | 12/1999 | Toosky et al. |
| 6,042,313 A | 3/2000 | Dehlke |
| 6,081,984 A | 7/2000 | Sherry |
| 6,171,038 B1 | 1/2001 | Pratt et al. |
| 6,224,310 B1 | 5/2001 | Summerlin et al. |
| 6,254,324 B1 | 7/2001 | Smith et al. |
| 6,276,050 B1 | 8/2001 | Mauer et al. |
| 6,299,398 B1 | 10/2001 | Shinjo |
| 6,389,676 B1 | 5/2002 | Denham |
| 6,398,472 B1 | 6/2002 | Jones |
| 6,418,599 B2 | 7/2002 | Suzuki et al. |
| 6,428,255 B1 | 8/2002 | Smith |
| 6,443,322 B1 | 9/2002 | Braun et al. |
| 6,445,568 B1 | 9/2002 | Baur et al. |
| 6,461,213 B1 | 10/2002 | Volz |
| 6,484,370 B2 | 11/2002 | Kanie et al. |
| 6,502,008 B2 | 12/2002 | Maurer et al. |
| 6,553,622 B2 | 4/2003 | Maruyama et al. |
| 6,637,995 B1 | 10/2003 | White |
| 6,746,192 B2 | 6/2004 | Eshraghi |
| 6,751,841 B2 | 6/2004 | Schnabel et al. |
| 6,754,066 B2 | 6/2004 | Doan et al. |
| RE38,664 E | 11/2004 | Luhm |
| 6,826,820 B2 | 12/2004 | Denham et al. |
| 6,854,940 B2 | 2/2005 | Jennings et al. |
| 6,877,204 B1 | 4/2005 | Schnabel et al. |
| 6,881,898 B2 | 4/2005 | Baker et al. |
| 6,898,918 B2 | 5/2005 | Eshraghi |
| 6,905,296 B2 | 6/2005 | Millington |
| RE39,582 E | 4/2007 | Luhm |
| 2001/0005475 A1 | 6/2001 | Frigg |
| 2003/0082025 A1 | 5/2003 | Luhm |
| 2004/0022597 A1 | 2/2004 | Jones et al. |
| 2004/0071522 A1 | 4/2004 | Millington |
| 2004/0071525 A1 | 4/2004 | Millington |
| 2004/0247414 A1 | 12/2004 | Pearce et al. |
| 2005/0100423 A1 | 5/2005 | Summerlin |
| 2005/0214094 A1 | 9/2005 | Summerlin |
| 2006/0251490 A1 | 11/2006 | Kleinman et al. |
| 2007/0154277 A1 | 7/2007 | Smith et al. |

FOREIGN PATENT DOCUMENTS

| | | |
|---|---|---|
| DE | 40 03 136 A1 | 8/1991 |
| EP | 0 251 700 A2 | 1/1988 |
| EP | 635647 | 6/1994 |
| FR | 1494693 | 9/1967 |
| FR | 1553116 | 1/1968 |
| GB | 642664 | 9/1950 |
| GB | 1066033 | 4/1967 |
| GB | 1183049 | 3/1970 |
| GB | 1495592 | 12/1977 |
| GB | 1 572 269 | 7/1980 |
| JP | 62155318 | 7/1987 |
| JP | 63001808 | 1/1988 |
| JP | 3048106 | 5/1991 |
| JP | 05-335756 | 12/1993 |
| JP | 7012112 | 12/1995 |
| JP | 11-284357 | 10/1999 |

JP    2000-277947    10/2000

OTHER PUBLICATIONS

"Don't Overlook Blind Riveting When Designing Your Next Product", 'Design Engineering Feature', 'Product Engineering', Jul. 1974, 4 pages.

"Design Considerations For Blind Fasteners", 'OEM Design', Jul. 1992, 2 pages.

Paul A. Gustafson et al. : "For Special Applications: Special Blind Rivets", 'AE Design/Fastening/Joining', Aug. 1979, 3 pages.

Photograph of Emhart blind rivet Part No. 14021 (believed to have been publicly used prior to May 2002).

Photograph of Emhart blind rivet Part No. 14045 (believed to have been publicly used prior to May 2002).

Photograph of Emhart blind rivet Part No. 14046M (believed to have been publicly used prior to May 2002).

Photograph of Emhart blind rivet Part No. 14171 (believed to have been publicly used prior to May 2002).

Photograph of Emhart blind rivet Part No. 15780 (believed to have been publicly used prior to May 2002).

Photograph of Emhart blind rivet Part No. 15780M (believed to have been publicly used prior to May 2002).

Photograph of Emhart blind rivet Part No. 15891 (believed to have been publicly used prior to May 2002).

Photograph of Emhart blind rivet Part No. 16220M (believed to have been publicly used prior to May 2002).

Photograph of Emhart blind rivet Part No. 16225 (believed to have been publicly used prior to May 2002).

Photograph of Emhart blind rivet Part No. 16226 (believed to have been publicly used prior to May 2002).

Photograph of Emhart blind rivet Part No. 16289 (believed to have been publicly used prior to May 2002).

CHOBERT® Fastening Systems—Product Information brochure published Jan. 1997 (4 pages).

BRIV® Fastening Systems—Product Information brochure published Jan. 1997 (4 pages).

"Assembly Directory & Handbook", Hitchcock Publishing Company, vol. 5, 1966, pp. 218-249.

"Cherry Commercial Products—Cherry C Rivets" brochure published prior to 2002 (6 pages).

BLIND RIVET METHOD

CROSS-REFERENCE TO RELATED APPLICATIONS

This is a divisional application of U.S. Ser. No. 10/430,742, filed May 6, 2003, which claims priority to Great Britain Application No. 0210463.6, filed May 8, 2002, both of which are incorporated by reference herein.

FIELD OF THE INVENTION

The present invention is directed towards a blind rivet and more particularly to a blind rivet of the head break type whereby a mandrel head is ejected from the rivet body after setting.

BACKGROUND OF THE INVENTION

Conventional blind rivets comprise an outer tubular shell or body having an enlarged flange at one end, together with a mandrel associated therewith, such mandrel comprising a cylindrical stem extending through the tubular rivet body so as to be coaxial therewith, the stem having a radially enlarged head at one end for engagement with an end face (tail end) of the rivet body remote from the enlarged flange. The blind rivet is then passed through a preformed hole in a workpiece until the flange engages with the edge of the hole and is held in engagement therewith during a setting operation. During setting, the remote end of the rivet, which is disposed inwardly of the work pieces (the blind side), is then compressed towards the flange by drawing the mandrel stem, and hence the mandrel head, back towards the flange, whereby the deformed portion of the rivet body compresses the work piece therebetween with the flange itself.

Of this type of blind rivet there are two main types. A break stem type blind rivet relies on the mandrel head entering the tail end of the rivet body and being pulled through the rivet body so as to be encapsulated thereby, until the mandrel head meets resistance as the expanded rivet body engages the blind side of the work pieces, whereby the subsequent increase in load on the mandrel stem causes this stem to break at a predefined weakened region so that the mandrel head is retained within the rivet body to form an expanded portion or bulge of the rivet body on the blind side of the work piece thereby compressing the work pieces between this enlarged region and the flange.

Alternatively, a break head type blind rivet relies upon the mandrel head being ejected following setting. In this type of blind rivet, the mandrel head has an abrupt change of section between the mandrel stem and the mandrel head to present a shoulder portion which engages the tail end of the blind rivet to exert a substantially axial force thereon thereby compressing and deforming the end of the rivet against the blind side of the work piece to form a flattened bulge between which the work pieces are again compressed against the flange. Here again a weakened region of the stem will again break, but since the mandrel head has not being drawn into the rivet body it is simply ejected away therefrom when the stem breaks due to the high reaction force between the deformed rivet body and the head.

However, in both these conventional types of blind rivet, a defined or enlarged section of the blind rivet is maintained on the blind side of the work piece presenting a projection which may limit the available workspace on the blind side of the work pieces. This is particularly relevant in the use of blind rivets to manufacture small cabinets, such as those used in the computer industry, whereby the internal projection of a set blind rivet may interfere with the placement of components within such cabinets.

It is therefore an object of the current invention to provide an improved blind rivet which alleviates the aforementioned problems.

SUMMARY OF THE INVENTION

According to the present invention there is now provided a blind rivet comprising an axially extending hollow tubular body having a tail end face at one end, and a pre-formed radially enlarged flange at the other end, the rivet further comprising a mandrel having a stem which extends co-axially through the tubular body and having an enlarged head adjacent the tail end of the body, this head having an outer diameter greater than an inner diameter of the body, wherein the mandrel has a uniform conical shoulder extending between the outer diameter of the head and the stem, the stem being further provided with a weakened region immediately adjacent this conical shoulder. Preferably the angle of this conical surface will be inclined at an angle between 91 and 110° to the axis will usually lie between 98 and 102°. Ideally, this angle will be at 100°. The use of such a conical surface to form a conical shoulder at these angles has been found to transmit a force, as the mandrel head is drawn into the rivet body, which has an axial component serving to compress the rivet body and also has a axially inclined component which serves to deform the tail end face of the rivet body conically outwards of its axis.

It is also preferred that the head diameter of the mandrel head is between 4% and 9% greater than an outer diameter of the tubular rivet body. For this reason, the rivet is intended to be inserted into a preformed hole extending through a workpiece/s which must have a diameter greater than this maximum head diameter and which is usually provided to have a diameter 10% greater than the body diameter. However, the hole diameter may lie in a range of 9% and 15% greater than the body diameter, dependent on the head diameter. This increased diameter of the head alleviates the possibility of the head being drawn into the rivet body during setting.

Furthermore, it is preferred that the mandrel head has an outer cylindrical diameter, usually co-axial with the rivet body, having an axial length of at least 1 mm, again to alleviate the possibility of the conically deformed body encompassing the mandrel head during the setting operation and, further, to prevent the head from becoming distorted (or "dished") under the large loads applied thereto during a setting operation.

It is also preferred that the axial length of the rivet body will be between 25% and 55% greater than the grip thickness of such rivet, the grip thickness being defined as the combined thickness of the work pieces being joined together by this rivet and hence the thickness to be gripped thereby. This predefined rivet body length ensures that there is sufficient rivet body material to form an appropriate rivet joint and to flow into the preformed hole in the workpieces without resulting in excess rivet body material projecting excessively from the blind side of the connected work pieces once set.

Further according to the present invention there is also provided a method of fastening together at least two work pieces using a blind rivet, which method comprises the steps of selecting an axially extending blind rivet having a body with a length between 25% and 55% greater than the combined thickness of the at least two work pieces, the body also having a known outer diameter, then, pre-forming a hole through the workpieces, which hole having a diameter between 9% and 15% greater than the outer diameter of the rivet body, and subsequently inserting the blind rivet through this hole; this method then provides the step of applying an axial setting force to the rivet body by use of a mandrel head having a conical shoulder, whereby this setting force has a first axial component which is exerted in the axial direction to compress the rivet body into the hole and a second annular component to deform the rivet body conically outwards of its axis. Furthermore, it is preferred that the hole forming step comprises providing the blind side of the hole with a counter-sunk region so that the conical deformation of the rivet body is deformed into the counter-sunk region of the hole, so as not to project substantially proud of the blind side of the workpiece.

Preferably, this method will comprise the selecting and inserting of a blind rivet according to the present invention and as described above.

The preferred embodiment of the present invention will now be described, by way of example only, with reference to the accompanying, illustrative drawings in which:

DETAILED DESCRIPTION OF THE PREFERRED EMBODIMENTS

Figure 1:
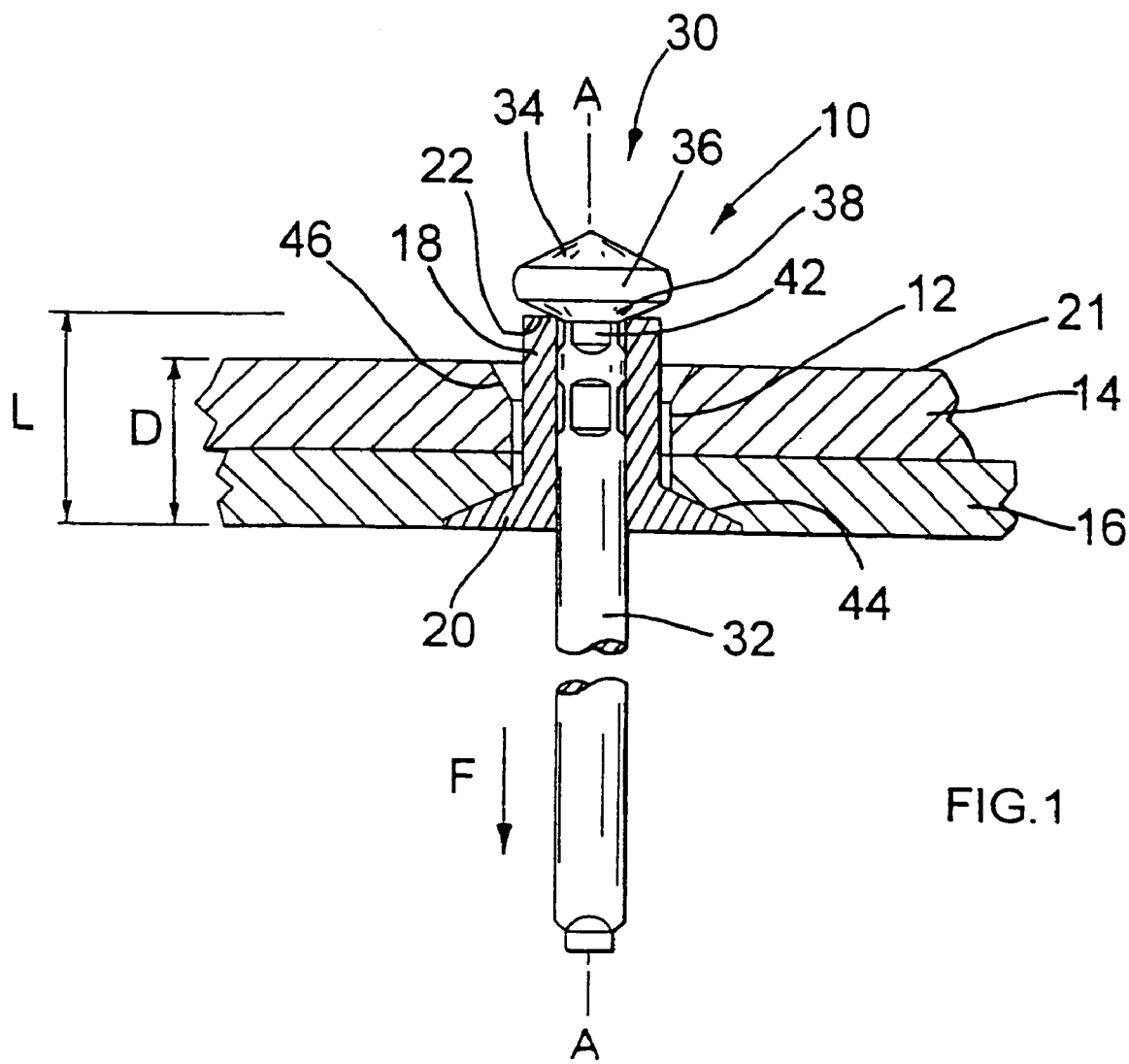
FIG. 1 is a partial cross-section of a blind rivet according to the present invention inserted through a workpiece.

Referring now to FIG. 1, a blind rivet assembly 10 is shown inserted, but not set, in a preformed hole 12 extending between two work pieces 14 and 16. The rivet assembly 10 comprises a hollow tubular rivet body 18 having an enlarged counter-sunk flange 20, this counter-sunk head tapering inwards along an axis A of the rivet body for complimentary receipt within a pre-formed counter-sunk region 44 of the hole 12.

The remote tail end 22 of the rivet body 18, axially opposed to the flange 20, has a substantially flat end face extending perpendicular to the rivet axis A. The rivet body length L is predetermined to be between 25% and 55% greater than the combined depth D of the two work pieces 14 and 16. This depth D is commonly referred to as the grip thickness of a blind rivet—defined as the thickness of materials to be gripped by the set rivet. In the present embodiment, depth L is approximately 30% greater than depth D. As is conventional for blind rivets, the assembly 10 is further provided with a mandrel 30 comprising a cylindrical mandrel stem having an enlarged head 34 at its blind end thereof which lies adjacent to the tail end 22 of the rivet body 18. The mandrel stem 32 is of substantially uniform cross-section area along its axial length and which diameter is substantially equal to the internal diameter of the tubular rivet body 18 so as to form a complimentary frictional fit therewith.

The mandrel head 34 has a maximum outer diameter defined by a radial wall 36 extending coaxial about the axis A and having an axial length of at least 1 mm. This minimum axial length of the mandrel head is required to provide appropriate strength to the head to alleviate the possibility of the mandrel head distorting, or "dishing" when it is subject to large stresses during the rivet setting operation and particularly when the circumference of the head is engaged with the rivet body to effect deformation thereof (as described below).

The diameter of this wall 36 is greater than the maximum outer diameter of the rivet body so as to be at least 4% greater than the body diameter, but no greater than 9% thereof.

The shoulder 38 of the mandrel head, extending between the outer wall 36 and the mandrel stem, is axially inclined to form a substantially uniform conical surface which has a preferred angle of inclination, relative to the axis A, of 100°, although this angle of conical angular inclination can lie between the ranges of 91 and 110° to remain within acceptable operational parameters. This angular range has been determined to be appropriate for effecting the required deformation of the rivet during setting.

The remote end of the mandrel head is also provide with a conical surface about axis A to act as an alignment mechanism for the assembly 10, whereby the inclined surfaces thereof help align the assembly with the hole 12 as it is being inserted therein.

The mandrel head diameter is required to be at least 4% greater than the outer diameter of the rivet body to alleviate this head being pulled into the body during the setting operation, which could prevent the head being ejected after setting. However, this diameter must not exceed 9% greater than the rivet body otherwise too large a hole will be required through the workpieces to allow the rivet to pass therethrough, making the filling of this hole difficult during setting (possibly leaving the set rivet loosely set) or the closer the hole diameter is to the diameter of the flange the risk of failure of the set rivet increases.

Furthermore, the mandrel stem 32 is provided with a preformed weakened region 42 immediately adjacent this conical surface 38. As is conventional for blind rivets, this weakened region 42 is formed as a narrowed portion of the stem resulting from squaring off the stem diameter to provide four flats about the diameter so as to present a substantially square cross-sectional area immediately adjacent the head being thinner, and hence weaker, than the main mandrel stem. Alternatively, the weakened portion could result from two or more diametrically opposed indentations or even a circumferential groove. What is important here is that such weakened portion be immediately adjacent the mandrel head.

Since the mandrel head 34 has a diameter greater than the rivet body 18, it is essential that the preformed hole 12 be of a diameter at least equal to that of the maximum mandrel head diameter and is usually formed to be 10% greater than the maximum diameter of the body (since the maximum diameter of the head is limited to 9% greater than the maximum diameter of the body). However, the hole 12 can be formed to have a diameter of between 9% and 15% greater diameter than that of the maximum body diameter, dependent on the exact diameter ratio of the mandrel head to rivet body. Usually the blind rivet system utilising a rivet according to the present invention will be compatible with standard hole sizes made with existing standard size drill bits (i.e. the rivet body diameter being such that the holes are 10% greater in diameter) although different size rivets could also be produced but requiring specific hole forming tools (drill bit) which will be of appropriate diameter to use with such rivets.

Furthermore, the preformed hole 12, whilst having a counter-sunk region 44 to accommodate the counter-sunk head 20 of the rivet body, will also have formed on the blind side region 21 of the workpieces (i.e. the inner side or that side opposite to the setting tool) a conical counter-sunk region 46 extending about the periphery of the hole.

Once the rivet assembly 10 has been inserted through this preformed hole 12 it may be set using a conventional blind rivet setting tool (not shown) which comprises a nose portion for restraining the rivet body flange (or head) 20 in solid abutment with the work piece 16, whilst having a displaceable jaw mechanism for clamping the mandrel stem 32 and exerting a setting force F in the direction shown substantially by the arrow F in FIG. 1.

The application of the setting force F draws the mandrel head into engagement with the flat surface of tail end portion 22 of the rivet body which, due to its conical shoulder 38, exerts a setting force having a first component extending in an axial direction and which serves to compress the rivet body 18 towards the rivet flange 20, resulting in radial expansion of the compressed (reduced length) rivet body so as to fill the enlarged hole 12 (this radial expansion being outwardly, due to the mandrel stem being maintained through the body 18). The conical shoulder 38 also provides a secondary force component perpendicular to the conical surface of the such 38 which serves to deform the tail end 22 of the rivet body radially and conically outwards so that the mandrel head 34 does not substantially enter this shortened rivet body which, due to the axial length of the walls 36 (and the restricted length of the rivet body) is also unable to encompass and surround the mandrel head 34. Rather, some of the material of tail end 22 of the rivet 18 is partially displaced axially towards the rivet head 20 with the remaining material of the rivet body in this tail end region forming a considerably thinned conical outer wall (FIG. 2) which is displaced into the counter-sunk region 46 of the hole 12 so as not to project externally of the secured workpieces. Thus the combination of the conical shoulder 38 of the mandrel and the countersunk region 46 serve to provide such conical spreading of the tail end of the body.

Continued axial displacement of the mandrel in direction F results in an increased resistance force encountered by the mandrel head 34 as it encounters the workpiece 14, and which subsequently prevents further displacement of the mandrel head. Continued application of the setting force F the increases the stress on the mandrel stem in a conventional manner until resulting failure of the mandrel stem 32 at the weakened region 42. The resultant re-action force between the rivet head 34 and the rivet body 18 causing ejection of the rivet head 34 therefrom.

Figure 2:
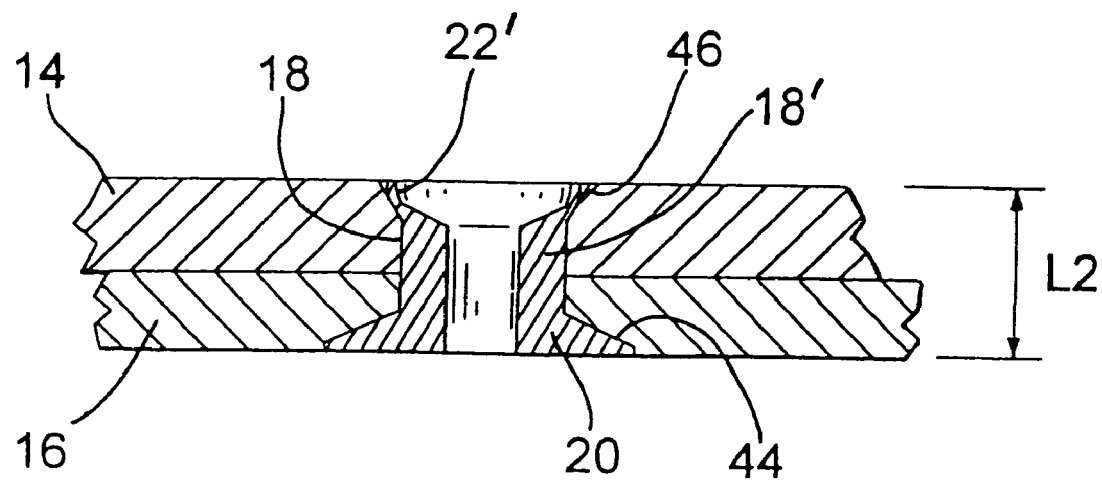
FIG. 2 is a cross-sectional view of the set rivet body of the rivet of FIG. 1.

The resultant set blind rivet is shown in FIG. 2 having a compressed axial length L2, substantially equal to the grip thickness D, whereby the axially displaced rivet body material has been squeezed into the enlarged hole 12 to provide a rivet body having an increased body thickness 18' in this region and which has a substantially conical, cup-shaped tail end 22' formed into the counter-sunk region 46 of the pre-formed hole 12. In this manner, a substantially rigid rivet joint is formed which does not extend substantially proud of the blind side of the work piece 14.

Furthermore, the angular setting range of the conical shoulder has been determined so that the appropriate deformation forces can be applied to compress and conically deform the rivet body in the manner described above. If the angle of this conical surface was greater than 110 degrees then there would be a risk that insufficient axial force would be applied during setting and that the head could be pulled into the rivet body. If this angle was less than 90 degrees then there would be no angular force component to effect conical deformation of the tail end of the rivet and the mandrel head is likely to be ejected without the rivet being correctly set.

In this preferred embodiment, the rivet body head 20 is shown to be counter-sunk so that this head 20 is also maintained flush with the outer work piece 16 once set, although this feature is optional and it will be appreciated that the current invention may utilize a conventional blind rivet which does not use a counter-sunk head.

The importance of providing the length L within the pre-defined ranges discussed above is to provide sufficient material of the rivet body to allow appropriate deformation of the rivet body to fill the enlarged hole 12 after setting and to form a sufficiently robust set-end of the rivet that will resist any applied tensile loading on that joint, but not to result in excess rivet body material which cannot be accommodated by the counter-sunk region 46 of the hole 12 and may project beyond the blind side of the workpiece.

While the above detailed description describes the preferred embodiment of the present invention, it should be understood that the present invention is susceptible to modification, variation and alteration without deviating from the scope and fair meaning of the subjoined claims.

The invention claimed is:

1. A method of fastening together workpieces using a blind rivet, the method comprising:
   (a) using a blind rivet having a hollow central body segment, a tool-side flange and a blind-side end;
   (b) creating a hole in the workpieces with countersunk depressions in tool-side and blind-side surfaces of the workpieces;
   (c) inserting the rivet body segment and the blind-side end in the hole;
   (d) applying an axial setting force to the rivet body by use of a removable head having a conical shoulder, the head being mounted on an elongated shaft operably extending through the rivet body segment;
   (e) compressing the tool-side flange of the rivet into the countersunk depression in the tool-side surface of the workpieces, wherein all of the tool-side flange is substantially flush with or below the tool-side surface after setting, the tool-side flange having a greater wall thickness between its inside and outside diameters than the wall thickness of the body segment both before and after setting;
   (f) deforming the blind-side end of the rivet outwardly into the countersunk depression in the blind-side surface of the workpieces, wherein all of the blind-side end is substantially flush with or below the blind-side surface after setting;
   (g) the workpiece hole being radially larger than the central body segment of the rivet prior to setting, and radially expanding the central body segment of the rivet within the workpiece hole during setting; and
   (h) a bore of the rivet body segment being unobstructed after setting.

2. The method of claim 1 wherein the rivet body segment and flange have a continuous and uniformly sized bore therethrough, at least prior to rivet setting.

3. The method of claim 1 wherein the rivet flange has a substantially conical outside shape.

4. The method of claim 1 wherein the rivet flange is pre-shaped into an enlarged configuration prior to rivet setting.

5. The method of claim 1 further comprising creating a bulbously curved outside surface adjacent the blind-side end during the deforming step.

6. The method of claim 1 further comprising intentionally breaking the shaft during rivet setting.

7. The method of claim 1 further comprising inserting the shaft and rivet body segment together into the hole of the workpieces, the shaft snugly fitting within the rivet body segment during the insertion.

8. The method of claim 1 further comprising setting the blind rivet so that a tool-facing surface and an opposite blind surface of the blind rivet are substantially parallel to each other and to the corresponding tool and blind-side surfaces of the workpieces after the setting.

9. The method of claim 1 further comprising inserting the blind rivet into a computer cabinet.

10. A method of fastening together at least two workpieces using a blind rivet, the method comprising:
   (a) selecting a blind rivet having: (i) an integral pre-formed flange, and (ii) a body with a length between 25% and 55% greater than the combined thickness of the workpieces, and having a known outer diameter, the flange having a greater wall thickness than that of the body at least before setting;
   (b) pre-forming a hole in the workpieces having a diameter between 9% and 15% greater than the known outer diameter;
   (c) inserting the rivet body through the hole; and
   (d) applying an axial setting force to the rivet body by use of a mandrel head having a conical shoulder;
   wherein the setting force has a first axial component which is exerted in the axial direction to compress the rivet body into the hole, and a second angular component to deform the rivet body conically outwards; and
   wherein the workpiece hole is radially larger than the body of the rivet prior to setting, and radially expanding the body of the rivet within the workpiece hole during setting.

11. The method of claim 10 wherein the hole forming step comprises creating the blind side of the hole with a countersunk region, so that the conical deformation of the rivet body is deformed into the countersunk region of the hole.

12. The method of claim 10 further comprising using the rivet body and integral pre-formed flange with a continuous and uniform diameter bore therethrough, at least prior to rivet setting.

13. The method of claim 10 wherein the pre-formed flange has a substantially conical outside shape and a cross-sectional wall thickness greater than a cross-sectional wall thickness of the rivet body, both before and after rivet-setting.

14. The method of claim 10 further comprising setting the blind rivet such that all of the rivet is located between planes defined by outer surfaces of the at least two workpieces.

15. The method of claim 10 further comprising intentionally breaking a mandrel shaft during rivet-setting to remove the mandrel head from the rivet body.

16. A method of fastening workpieces using a blind rivet, the method comprising:
   (a) inserting the blind rivet into a hole in the workpieces;
   (b) locating a pre-expanded tool-side flange of the rivet, with a substantially cylindrical outside surface, into a countersunk opening in a tool-side surface of the workpieces;
   (c) setting the blind rivet to the workpieces by compressing a blind-end of the rivet into a countersunk opening in a blind-side surface of the workpieces;
   (d) allowing a bore in the rivet to be unobstructed and to have a substantially uniform inside dimension within at least the tool-side flange and a central body segment immediately adjacent to the flange, after the setting; and
   (e) the workpiece hole being radially larger than the central body segment of the rivet prior to setting, and radially expanding the central body segment of the rivet within the workpiece hole during setting.

17. The method of claim 16 further comprising creating a substantially bulbously curved outside surface adjacent the blind-side end during the setting.

18. The method of claim 16 further comprising inserting a mandrel and rivet body segment together into the hole of the workpieces, the mandrel snugly fitting within the rivet body segment during the insertion.

19. The method of claim 16 further comprising setting the blind rivet so that a tool-facing surface and an opposite blind surface of the blind rivet are substantially parallel to each other and to the corresponding tool and blind-side surfaces of the workpieces.

20. The method of claim 16 further comprising inserting the blind rivet into a computer cabinet.

21. The method of claim 16 further comprising compressing and expanding the blind-end of the rivet by pulling on a mandrel, the mandrel including an enlarged head adjacent to the blind-end, an elongated stem and a tapered shoulder located between the head and the stem.

22. The method of claim 16 further comprising intentionally breaking a mandrel attached to the blind rivet during the setting.

23. A method of fastening comprising:
   (a) inserting a blind rivet into a hole in at least one computer workpiece, inserting a mandrel and the attached rivet body segment together into the hole of the at least one computer workpiece, the mandrel snugly fitting within the rivet body segment during the insertion;
   (b) locating a pre-expanded tool-side flange, with a substantially cylindrical outside surface, entirely into a depression in a tool-side surface of the at least one computer workpiece;
   (c) compressing a blind-end of the rivet into a depression in a blind-side surface of the at least one computer workpiece; and
   (d) allowing a bore of the rivet to be unobstructed and to have a substantially uniform inside dimension within at least the tool-side flange and a central body segment immediately adjacent to the flange, after the setting.

24. The method of claim 23 further comprising creating a substantially curved and bulbous outside surface adjacent the blind-side end during the compressing.

25. The method of claim 23 further comprising setting the tool-side flange and blind-end of the rivet substantially flush with respective outside surfaces of the at least one computer workpiece.

26. The method of claim 23 further comprising setting the blind rivet so that a tool-facing surface and an opposite blind surface of the blind rivet are substantially parallel to each other and to the corresponding tool and blind-side surfaces of the at least one computer workpiece.

27. The method of claim 23 further comprising intentionally breaking a mandrel attached to the blind rivet during the setting.

28. The method of claim 23 further comprising outwardly expanding the blind-end of the blind rivet with a tapered shoulder on a mandrel, and inserting a substantially pointed blind-end of the mandrel into the hole in the at least one computer workpiece prior to inserting the blind rivet into the hole.

29. The method of claim 23 further comprising countersinking a substantially conical shape in outside surfaces of the at least one computer workpiece for the depressions.

* * * * *